July 17, 1962 P. BRÖSICKE 3,044,354
CROSS-SLIDE TABLE FOR MICROSCOPES
Filed Aug. 10, 1959
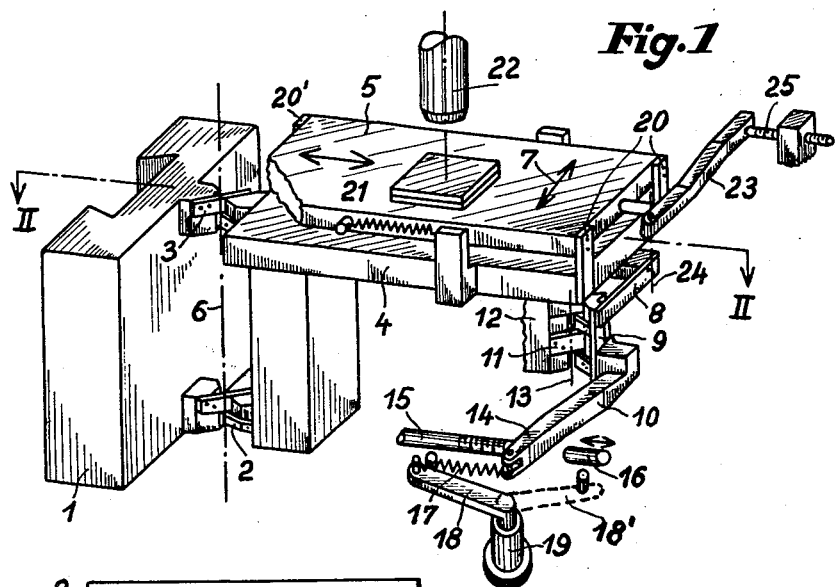
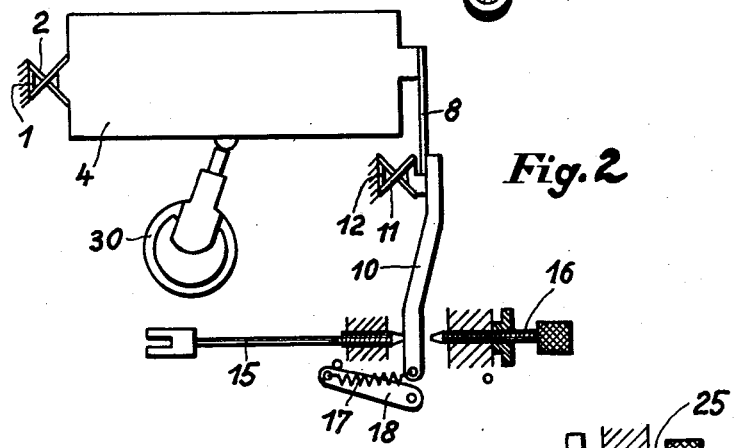
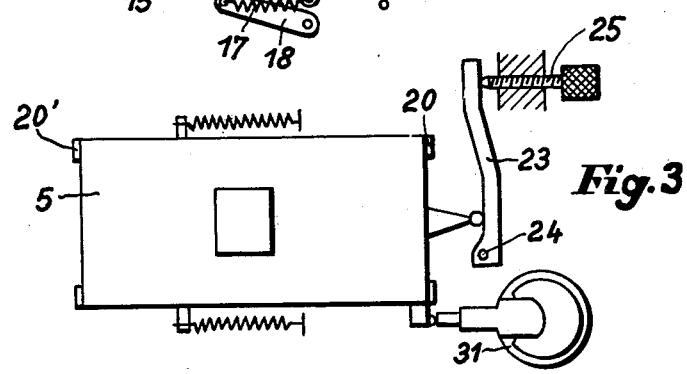

United States Patent Office 3,044,354
Patented July 17, 1962

3,044,354
CROSS-SLIDE TABLE FOR MICROSCOPES
Paul Brösicke, Heidenheim (Brenz), Germany, assignor to Carl Zeiss, Oberkochen, Württemberg, Germany
Filed Aug. 10, 1959, Ser. No. 832,844
Claims priority, application Germany Aug. 23, 1958
4 Claims. (Cl. 88—40)

The invention relates to a cross-slide table for microscopes.

The cross-slide table of the invention is constructed in such a manner that it is able to perform very small sliding movements relative to the optical axis of the microscope objective in order to make measurements. In particular, the cross-slide table of the invention is intended for use in microspectrophotometers. Cross-slide tables of the mentioned type must be constructed in such a manner that they are suitable for adjusting the object observed by the microscope in two directions which are arranged at right angles to one another and in particular the cross-slide tables must be able to be moved in a line-like or strip-like or meander-like manner whereby the size of the strip from line to line is approximately 1µ (0.001 millimeter). Furthermore, cross-slide tables of this type require that the optical axis which is directed onto the measuring point may be adjusted with an accuracy of µ toward a comparison point and then back to the measuring point, whereby the comparison point is approximately a distance equal to 200µ away from the measuring point.

It is an object of the invention to provide such a cross-slide table in which for all practical purposes any lost motion is eliminated and in which an adjustment equal to µ distances is possible. In order to achieve this object of the invention, the cross-slide table is constructed in such a manner that for the purpose of adjusting the table at least in one direction, the table is attached to at least one spring joint, torsion rod or the like, the axis of rotation of which is preferably arranged parallel to the optical axis of the microscope objective.

It has been discovered that the employment of such spring joints or torsion rods will result in the desired no lost motion mounting of the table. The spring joints permit also the desired movement of the table to the comparison point of the object which is being investigated.

It is also an object of the invention to perform the adjustment of the table by means of a leaf spring which is connected with one end to the table and with its other end to a lever which in turn is attached to a spring joint. In view of this lever transmission it is possible to slidably displace the table in the desired amount, whereby the leaf spring which is arranged between the mentioned lever and the table takes up the movement of the lever and of the table about the provided axes of rotation so that no jamming can take place.

In accordance with an additional object of the invention it is possible to make the lever movable within a space provided between a stationary stop and an adjustable screw spindle and to provide a spring which is suitable for moving the lever selectively against one end of said screw spindle or against said stationary stop. When the lever engages one end of the adjustable screw spindle, it is possible by a rotation of the screw spindle to perform adjustments of the table in the amount of µ. If, however, the lever is moved in one sweep between the stationary stop and the end of the screw spindle, then the optical axis passes at one end of the space through the measuring point and at the other end of said space or distance through the comparison point. The cross-slide table is of course also movable in a direction at right angles to the one discussed and for this purpose a suitable mounting and adjusting device is provided for the table.

It has been discovered, however, that the mentioned movement of the table in the second direction requires only a simple mounting in the form of a number of leaf springs which form a parallelogram and whose axes of rotation are arranged at right angles to the optical axis of the microscope.

The accompanying drawing illustrates one embodiment of the invention.

FIG. 1 illustrates a perspective view of the cross-slide table structure,

FIG. 2 illustrates a horizontal sectional view in the plane indicated by the line II—II of FIG. 1, and FIG. 3 is a top elevation view of the table plate according to FIG. 1.

Referring to the drawing, the stationary base 1 of the microscope has attached thereto by means of two vertically spaced spring joints 2 and 3 a horizontally extending carrier member 4 above which is arranged in spaced relation the table plate 5 of the microscope. The carrier member 4 by means of the mentioned spring joints 2 and 3 is adapted to be rotatably adjusted horizontally in the direction indicated by the double arrow 7 about a vertical axis 6 passing through the centers of the spring joints 2 and 3. As particularly illustrated in FIG. 2, the end of the carrier member 4 opposite the one where the spring joints 2 and 3 are arranged has attached thereto one end of a horizontally extending leaf spring 8. The other end 9 of the leaf spring 8 is attached to one end of a lever 10 which by means of a spring joint 11 is attached to another portion 12 of the base 1 of the microscope. The lever 10 extends away from the carrier member 4 and its outermost end 14 is movable between one end of a manually adjustable screw spindle 15 and a stop member 16 which latter is normally stationary but is axially adjustable so that the range of movement of the end portion 14 of the lever 10 may be varied. The outermost end of the lever 10 has attached thereto one end of the coil spring 17, the other end of which is attached to a lever arm 18. The lever arm 18 by means of a manually rotatable knob 19 is rotatable about its other end and may be adjusted from the position shown in full lines in FIG. 1 to the position 18' shown in dotted lines in the same figure. The coil spring 17 urges the end 14 of the lever 10 against the end of the screw spindle 15. If the screw spindle 15 is rotatably adjusted, then the carrier member 4 and therewith the table plate 5 connected thereto are moved by means of the leaf spring 8 in the direction indicated by the double arrow 7. When the knob 19 is rotatably adjusted to swing the lever arm 18 into the dotted line position 18', then the coil spring 17 moves the end 14 of the lever 10 against the stop 16. This movement also is transmitted to the microscope table structure composed of the parts 4 and 5, so that the table structure during the rotation of the knob 19 is moved a greater distance which is determined by the distance between the stop 16 and the end of the screw spindle 15.

Referring now particularly to the FIGS. 1 and 3 it will be noted that the carrier member 4 has attached to each of its narrow end walls pairs of leaf springs 20 and 20'. These leaf springs extend upwardly and have attached to their upper ends the table plate 5 so that the latter may be moved in the direction of the double arrow 21 and when this takes place, the table plate 5 moves in a direction downwardly with respect to the optical axis 22. This downward movement may be held within such small limits by a suitable dimensioning of the parts that the object placed on the table plate 5 remains within the range of the depth of focus of the microscope objective. The adjusting of the table plate 5 in a direction of the arrow 21 is effected by means of a lever 23 which is pivotally mounted about a vertical axis 24 which is spaced from one end wall of the table plate 5. The other end of the lever arm engages one end of an adjustment spindle 25 so that, when the lever is rotatably adjusted, a corresponding adjustment of the table plate 5 in the mentioned direction takes place.

The movements of the table structure 4, 5 in both directions are indicated by two micro calipers 30 and 31 respectively.

What I claim is:

1. In a cross-slide table for microscopes, particularly for microspectrophotometers, a stationary microscope base, a horizontally positioned table structure mounted beneath said microscope and extending normal thereto, at least one spring hinge joint forming means for connecting said base with said table structure to permit adjustment of said table in a horizontal plane about the axis of said spring hinged joint forming means, said spring joint forming means including crossed flat spring members having one of their ends connected to said base and their opposite ends connected to said table and forming a hinge axis extending parallel to the optical axis of the microscope, and means for adjusting said table structure about said hinge axis, said adjusting means including a leaf spring attached with one of its ends to said table structure, a lever fixedly attached with one of its ends to the other end of said leaf spring, a spring joint connecting said end of said lever with said base, and manually operable means for adjusting the other end of said lever.

2. In a cross-slide table according to claim 1, including two stop members arranged on opposite sides of said other end of said lever, one of said stop members being formed by said manually operable means, a spring connected with said lever and arranged to selectively move said lever into engagement with either one of said stop members.

3. In a cross-slide table for microscopes, particularly for microspectrophotometers, a stationary microscope base, a horizontally positioned table structure mounted beneath said microscope and extending normal thereto, at least one spring hinge joint forming means for connecting said base with said table structure to permit adjustment of said table in a horizontal plane about the axis of said spring hinged joint forming means, said spring joint forming means including crossed flat spring members having one of their ends connected to said base and their opposite ends connected to said table and forming a hinge axis extending parallel to the optical axis of the microscope, said table structure comprising a carrier member connected by means of said spring joint with said base and a table plate arranged in parallel spaced relation above said carrier member, and leaf springs forming a spring parallelogram connecting said carrier member and said table plate, the springs of said parallelogram being pivotally adjustable about axes which extend at right angles to said optical axis.

4. In a cross-slide table for microscopes, particularly for microspectrophotometers, a stationary microscope base, a horizontally positioned table structure mounted beneath said microscope and extending normal thereto, at least one spring hinge joint forming means for connecting said base with said table structure to permit adjustment of said table in a horizontal plane about the axis of said spring hinge joint forming means, said spring joint forming means including crossed flat spring members having one of their ends connected to said base and their opposite ends connected to said table and forming a hinge axis extending vertically and parallel to the optical axis of the microscope, said table structure comprising a carrier member connected by means of said spring joint with said base and a table plate arranged in parallel spaced relation above said carrier member, leaf springs forming a spring parallelogram connecting said carrier member and said table plate, the springs of said parallelogram being pivotally adjustable about axes which extend at right angles to said optical axis, and manually adjustable means including a pivotally mounted lever for adjusting said table plate relatively to said carrier member by flexing said leaf springs which connect said carrier member with said table plate.

References Cited in the file of this patent

UNITED STATES PATENTS

| | | |
|---|---|---|
| 1,713,412 | Winkel | May 14, 1929 |
| 2,034,110 | Mechau | Mar. 17, 1936 |
| 2,408,512 | Gradisar | Oct. 1, 1946 |
| 2,537,917 | Simmons | Jan. 9, 1951 |
| 2,542,755 | Dietrich et al. | Feb. 20, 1951 |
| 2,780,135 | Chandler | Feb. 5, 1957 |
| 3,009,390 | Gale | Nov. 21, 1961 |

FOREIGN PATENTS

| | | |
|---|---|---|
| 282,773 | Switzerland | Aug. 16, 1952 |